United States Patent [19]

Jehle et al.

[11] Patent Number: 4,891,648

[45] Date of Patent: Jan. 2, 1990

[54] AIRCRAFT RADAR ARRANGEMENT

[75] Inventors: Franz Jehle, Ulm; Roland Drescher, Voehringen, both of Fed. Rep. of Germany

[73] Assignee: Licentia Patent-Verwaltungs-GmbH, Frankfurt, Fed. Rep. of Germany

[21] Appl. No.: 195,324

[22] Filed: May 18, 1988

[30] Foreign Application Priority Data

May 20, 1987 [DE] Fed. Rep. of Germany ....... 3716857

[51] Int. Cl.⁴ .............................................. G01S 7/40
[52] U.S. Cl. ...................................... 342/20; 342/13; 342/56
[58] Field of Search .................... 342/13, 14, 20, 56, 342/59, 95-97, 147, 158

[56] References Cited

U.S. PATENT DOCUMENTS

| | | |
|---|---|---|
| 3,021,523 | 2/1962 | Davis et al. |
| 3,879,732 | 4/1975 | Simpson |
| 3,943,516 | 3/1976 | Hanson |
| 4,146,892 | 3/1979 | Overman et al. |
| 4,217,580 | 8/1980 | Lowenschuss |
| 4,393,382 | 7/1983 | Jones |
| 4,700,191 | 10/1987 | Manor ................................. 342/13 |

Primary Examiner—Thomas H. Tarcza
Assistant Examiner—John B. Sotomayor
Attorney, Agent, or Firm—Spencer & Frank

[57] ABSTRACT

In an aircraft on-board radar arrangement including a search radar and a radar warning receiving system, an additional receiving branch is provided to which are fed foreign radar signals received by the sharply focused transmit/receive antenna of the search radar, with the output of the additional receiving branch being connected to the radar warning receiver. This results in a greater angular resolution and a considerable increase in range, which again leads to a more detailed and early detected of threatening situations. By using already available components and because of the simple configuration of the additional receiving branch, additional costs remain low.

8 Claims, 1 Drawing Sheet

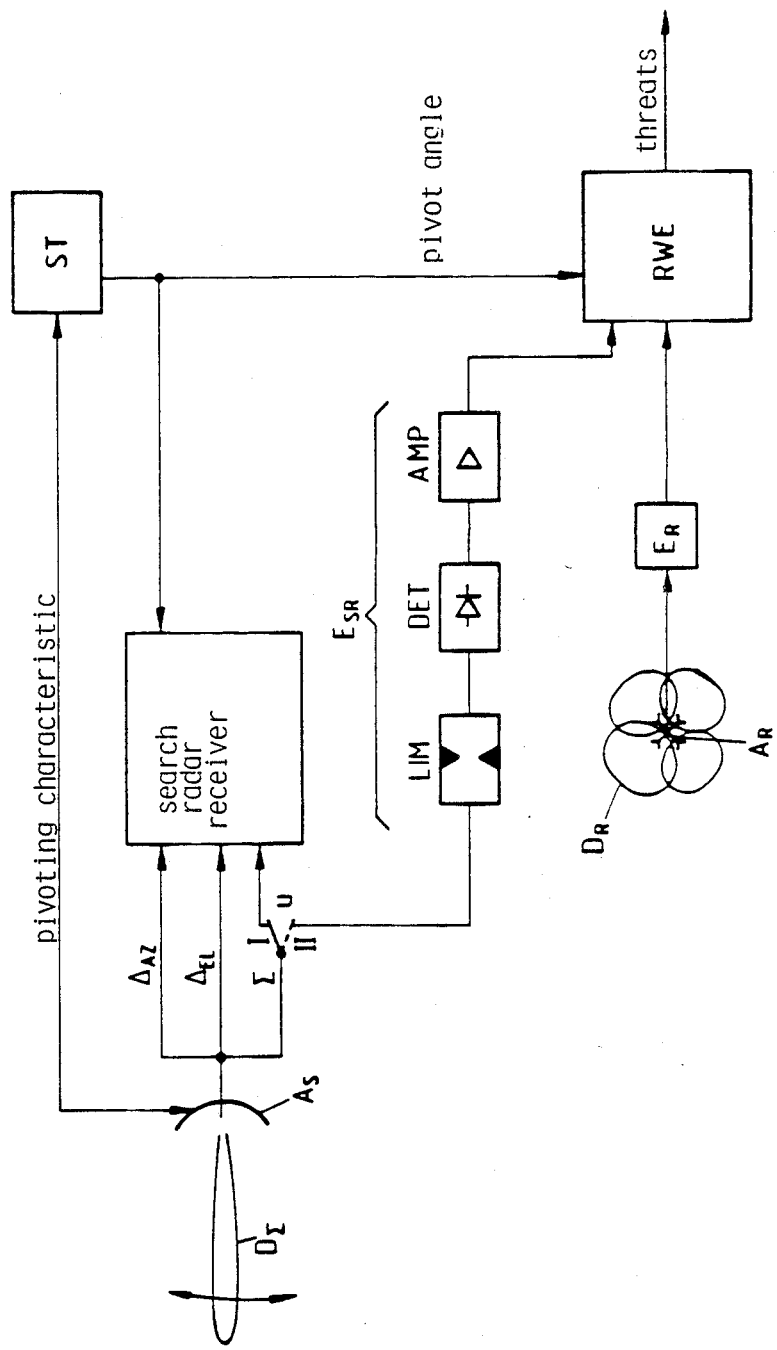

AIRCRAFT RADAR ARRANGEMENT

The invention relates to an aircraft radar arrangement.

Such radar arrangements are used primarily in combat aircraft. The search radar serves to detect radar targets in an azimuthal and elevational angular range given with respect to the aircraft axis. Due to the sharply focused directional characteristic, a very long range results with a given transmitting power and high accuracy in the determination of the target angle. To search the entire angular range, the directional characteristic may be pivoted mechanically or electronically. The radar warning receiving system is provided to receive signals from enemy search radar systems to be able to detect the danger of discovery by such enemy search radar as early as possible and to initiate countermeasures. For this purpose, radar warning systems include, in addition to the radar warning receiver, an antenna system for azimuthal omnidirectional reception. Customarily, the antenna system is constructed of a plurality of only weakly concentrating individual beams which cover the entire azimuth by way of an angularly offset arrangement.

It is obvious that countermeasures against discovery by enemy search radar will be the more effective and one's own safety thus the greater, the earlier and more accurately such a threatening situation is detected.

It is therefore the object of the invention to provide, in an aircraft radar arrangement of the above-mentioned type, to improve the detection of a threatening situation from enemy search radars.

SUMMARY OF THE INVENTION

This object and others to become apparent as the specification progresses are accomplished by the invention according to which briefly stated is an aircraft on-board radar arrangement including a search radar equipped with a sharply focused transmit/receive antenna having a pivotal directional characteristic. The arrangement has a radar warning receiving system with an antenna which is not or only slightly directional in azimuth. The arrangement further includes an additional receiving branch provided for the signals received by the transmit/receive antenna with the output signals of the receiving branch are fed to the radar warning receiver.

The sharply focused transmit/receive antenna $A_S$ of the aircraft search radar system, which is assumed to be designed for monopulse operation, generates a narrow, pencil-shaped directional characteristic $D_{93}$ and thus has a high antenna gain. The directional characteristic can be pivoted over a given (space) angle range. A control ST is provided to pivot the characteristic and has available at every point in time the precise information regarding the momentary pivot angle, i.e. the orientation of the directional characteristic. Construction of the antenna and possible ways of pivoting a characteristic are known in various forms. For example, the antenna $A_S$ may be a mechanically pivoted slot radiator antenna array or a phase controlled antenna array in which the characteristic is pivoted electronically. The transmitting signal branch is of no further significance for a consideration of the invention and is therefore not included in the drawing. The signals received by the antenna are combined, in a manner generally known for monopulse operation, into two difference signals $\Delta_{AZ}$ and $\Delta_{EL}$ and a sum signal $\Sigma$. The sum signal corresponds to the reception of signals by way of the pencil-shaped narrow directional characteristic shown in the drawing. The difference characteristics corresponding to signals $\Delta_{AZ}$ and $\Delta_{EL}$ are likewise generally known and therefore not drawn in for the sake of clarity. The signals $\Delta_{AZ}$, $\Delta_{EL}$ and $\Sigma$ are fed to the receiver of the aircraft search radar for target detection.

The radar warning system of the aircraft includes an antenna system $A_R$ which covers the entire azimuth range, a receiving branch $E_R$ not shown in detail and a radar warning receiver RWE. The radar warning antenna system $A_R$ is composed of four individual radiators each angularly offset by 90° and each having a barely focused, mutually overlapping characteristic $D_R$. By way of these (stationary) characteristics, signals can be received from the entire azimuth angle range. As can be easily seen, however, the antenna gain and the angular resolution (e.g. due to monopulse amplitudes) is only slight.

After passing through receiving branch $E_R$, the signals received through antenna system $A_R$ are fed to the radar warning receiver which sorts and processes the multitude of received signals according to known methods and reports detected threats from enemy radar systems.

So far the radar arrangement corresponds to the prior art arrangements employed. According to the invention, the arrangement includes an additional receiving branch $E_{SR}$ which receives the signals received by way of the sum characteristic $D_{93}$ of transmit/receive antenna $A_S$ of the search radar and whose output is connected to the radar warning receiver RWE.

The additional receiving branch essentially includes a signal detector (diode) DET, a limiter LIM to protect the signal detector and an amplifier AMP. By way of a switch U, the sum signal $\Sigma$ of the monopulse receiving system can be selectively fed to the search radar receiver (switch position I) during radar operation or to the additional receiving branch $E_{SR}$ (switch position II) during purely receiving operation. In principle, it is also possible to couple out a signal component from the $\Sigma$ branch by means of a coupler but then the signal level will drop. Preferred, however, is an embodiment including a switch U. In the radar warning receiver, the signals arriving by way of the additional receiving branch and containing the additional information from control ST are checked by way o the momentary pivot angle regarding a possibly threatening situation and are also linked with the signals received from the radar warning antenna system $A_R$.

The aircraft radar arrangement according to the invention has several remarkable advantages:

The precise angle determination permits detailed detection of the threatening situation. The precise angle information can also be used to easily separate signals from different transmitters. Additionally, the sorting process in the radar warning receiver which is expensive particularly when high pulse densities are involved, can be performed in a simpler and more effective manner by way of the signals received through antenna $A_R$ if the signals from the additional receiving branch available together with the additional information about the pivot angle are linked with the signals from radar warning antenna $A_R$.

Because of the high antenna gain of the transmit/receive antenna there results a considerable increase in range and thus an earlier detection of threatening situations. In this connection, it is of particular significance that the angular range monitored by the transmit/receive antenna lies in the direction of flight and thus covers precisely the range in which accurate and early detection and identification of threats is particularly important since the distance from threatening radars rapidly decreases in the direction of flight and thus the threat quickly becomes greater.

Reception by way of the transmit/receive antenna also broadens the possibility of picking up radar signals of less power but longer transmitter activity, such as, for example, CW radars, pulse radars operating with a high pulse repetition rate or with pulse compression.

Although the aircraft search radar is generally designed only for a narrow frequency range, antenna $A_S$ (including the monopulse characteristic formation) exhibits a high gain over a relatively broad frequency range. The simply constructed additional receiving branch is likewise broadbanded so that the radar warning operation together with the transmit/receive antenna and the additional receiving branch is able to detect a large portion of the radar systems that might be considered a threat.

The additional circuitry required is low so that no drawbacks worth mentioning occur either with respect to space requirements or weight or costs compared to prior art arrangements. In particular, existing radar arrangements can be retrofitted at little expense with the additional receiving branch. Due to the additional information, it is merely necessary to essentially modify the evaluation program in the radar warning receiver RWE.

It will be understood that the above description of the present invention is susceptible to various modifications, changes and adaptations, and the same are intended to be comprehended within the meaning and range of equivalents of the appended claims.

We claim:

1. In an on-board radar arrangement for an aircraft including a search radar having a sharply focused transmit/receive antenna oriented generally in the direction of travel of said aircraft for providing a first reception signal, and an antenna direction control for providing an antenna orientation signal and further including a radar warning system for detection and analysis of remote radar having an omnidirectional receiving antenna for providing a second reception signal, the improvement comprising;
   a first circuit for providing said first reception signal to the radar warning system,
   a second circuit for providing said orientation signal to said radar warning system, and
   means associated with said radar warning system including means for utilizing said first and second reception signals to enhance the reception resolution in the direction of flight of said aircraft in order to achieve increased sensitivity of remote radar detection in said direction of flight of said aircraft, and means for utilizing said orientation signal and said first and second reception signals to distinguish between the detection of radar located in said direction of flight and the detection of radar not located in said direction.

2. A radar arrangement according to claim 1, wherein said first circuit further includes a switch for selectively disconnecting said reception signal from said radar warning system.

3. Arrangement according to claim 1, wherein said transmit/receive antenna is designed for monopulse operation and said first circuit is provided for the sum signals.

4. Arrangement according to claim 2, wherein said transmit/receive antenna is designed for monopulse operation and said first circuit is provided for the sum signals.

5. Arrangement according to claim 1, wherein said first circuit essentially includes a limiter, a signal detector and an amplifier.

6. Arrangement according to claim 2, wherein said first circuit essentially includes a limiter, a signal detector and an amplifier.

7. Arrangement according to claim 3, wherein said first circuit essentially includes a limiter, a signal detector and an amplifier.

8. Arrangement according to claim 4, wherein said first circuit essentially includes a limiter, a signal detector and an amplifier.

* * * * *